United States Patent [19]

Rhule et al.

[11] Patent Number: 5,603,523
[45] Date of Patent: Feb. 18, 1997

[54] BIAS FLAP FOR AIR BAG MODULE

[75] Inventors: Daniel A. Rhule, Miamisburg; Troy A. Augustine, Kettering; Tobias J. Mosler, Troy; Dean M. Pepperine, Tipp City; Vince Otto, Dayton, all of Ohio

[73] Assignee: General Motors Corporation, Detroit, Mich.

[21] Appl. No.: 518,913

[22] Filed: Aug. 24, 1995

[51] Int. Cl.⁶ ............................ B60R 21/20; B60R 21/22
[52] U.S. Cl. .................... 280/728.2; 280/730.1; 280/732
[58] Field of Search .................. 280/728.2, 730.1, 280/732, 743.1, 743.2, 728.1

[56] References Cited

U.S. PATENT DOCUMENTS

| | | | |
|---|---|---|---|
| 4,842,300 | 6/1989 | Ziomek et al. | 280/732 |
| 4,941,678 | 7/1990 | Lauritzen et al. | 280/732 |
| 5,234,227 | 8/1993 | Webber | 280/732 |
| 5,348,343 | 9/1994 | Hawthorn | 280/730 |
| 5,351,987 | 10/1994 | Donegan et al. | 280/728.2 |
| 5,364,124 | 11/1994 | Donegan et al. | 280/730.1 |
| 5,447,329 | 9/1995 | Hamada | 280/728.1 |
| 5,490,690 | 2/1996 | Mihm | 280/728.2 |
| 5,498,030 | 3/1996 | Hill et al. | 280/728.2 |

FOREIGN PATENT DOCUMENTS

558271A1  9/1993  European Pat. Off. ............ 280/728.2

*Primary Examiner*—Brian L. Johnson
*Assistant Examiner*—Peter C. English
*Attorney, Agent, or Firm*—Kathryn A. Marra

[57] ABSTRACT

An air bag module includes an air bag and an inflator for generating gas to inflate the air bag. An air bag retainer is secured to the air bag. A bias flap is formed separate from the air bag and guides deployment of the air bag. The bias flap includes opposing side walls and at least one tether extending therebetween and connecting the side walls. The air bag and air bag retainer are located between the side walls of the bias flap and the tether extends beneath the air bag and air bag retainer to securely anchor the bias flap to the air bag during air bag deployment.

12 Claims, 3 Drawing Sheets

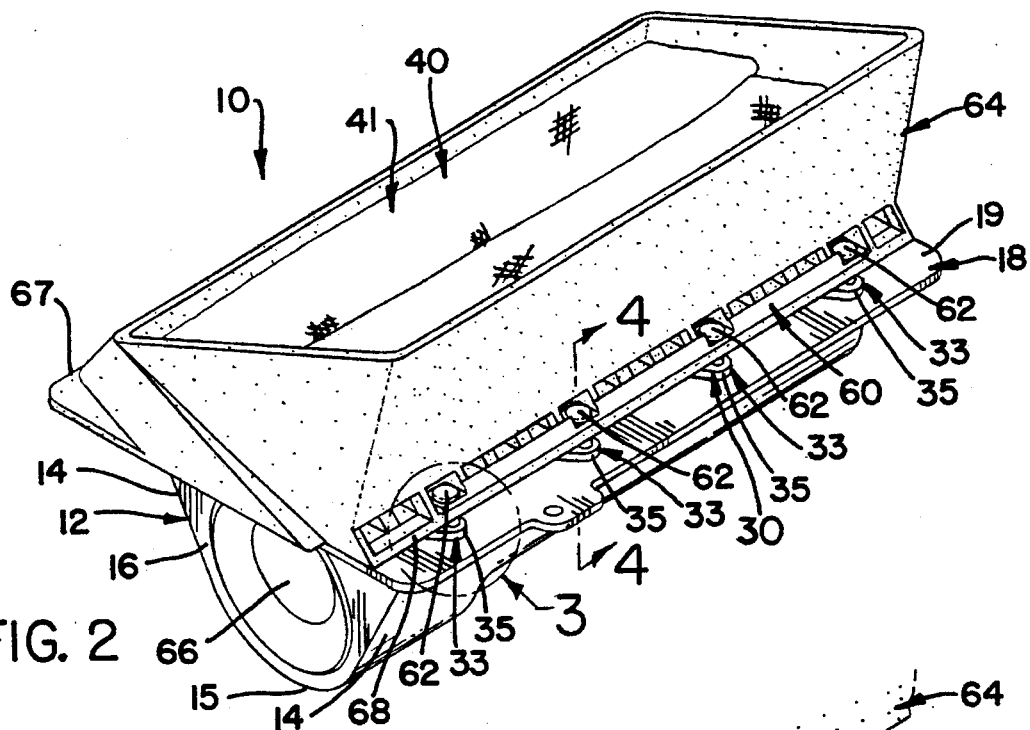
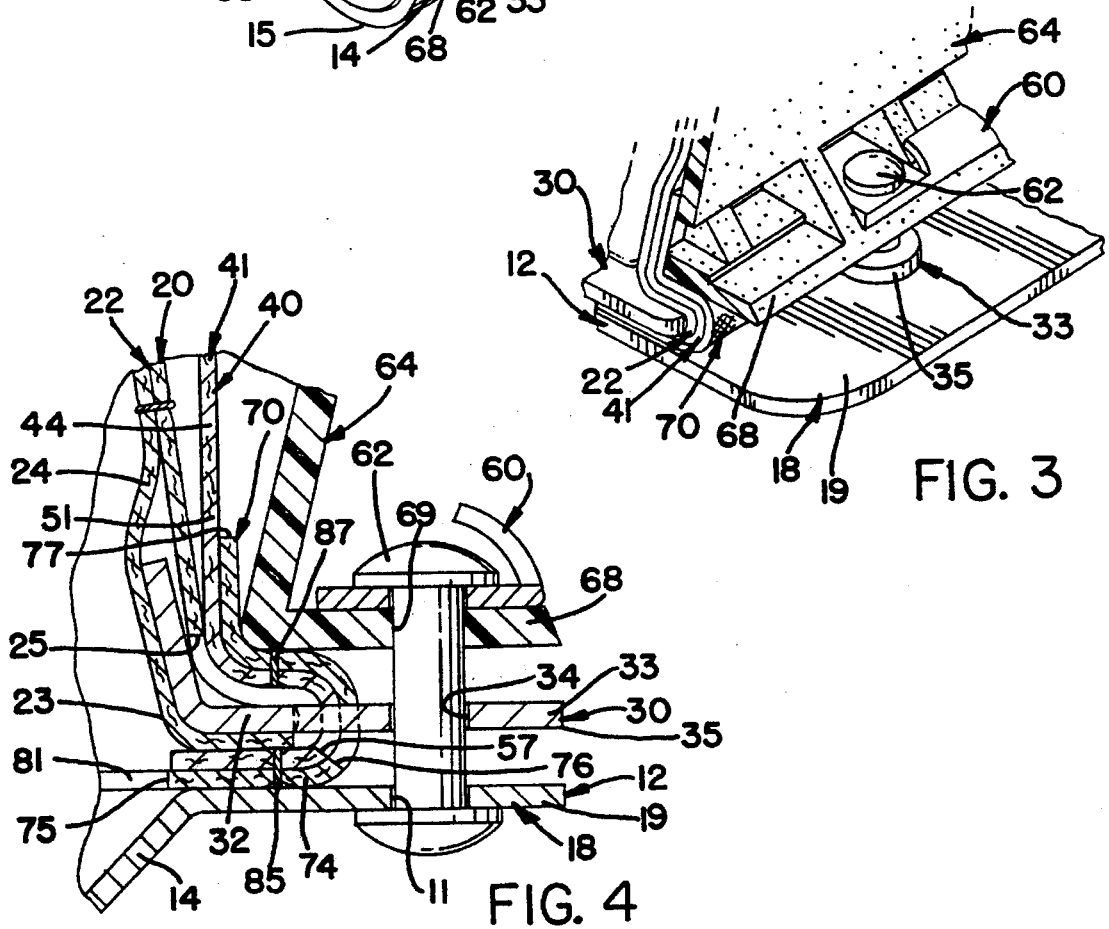
FIG. 2
FIG. 3
FIG. 4

BIAS FLAP FOR AIR BAG MODULE

This invention relates to a vehicle air bag module, and more particularly to an apparatus for biasing the direction of a deploying air bag.

BACKGROUND OF THE INVENTION

It is well known in motor vehicles to provide an air bag module which is mounted beneath an opening in the instrument panel. The air bag module typically includes a canister having a canister opening and enclosing an inflator for generating gas to inflate an air bag for deployment out through the opening in the instrument panel.

The prior art has recognized that deployment of the air bag may be directed by a biasing apparatus such as a flexible sleeve, chute, or guide member folded atop the air bag in the module. The prior art discloses that the bias apparatus may be connected to the air bag module, such as by sewing to the air bag. The prior art also discloses that the bias apparatus may be connected to the air bag module, such as by inserting fasteners through aligned mating holes in the sleeve and air bag module.

The biasing apparatus of the prior art have the shortcoming of being relatively difficult to assemble. For example, sewing the biasing apparatus to the air bag may be cumbersome and subsequent folding of the air bag after attachment of the biasing apparatus may be difficult. In addition, assembly time is alternately increased to align fastener holes in the flexible material of the biasing apparatus with holes in the cushion retainer and canister for insertion of a fastener through the multiplicity of holes.

SUMMARY OF THE INVENTION

The present invention solves the shortcomings of the prior art by providing an air bag module including an improved bias flap which controls the deployment direction of the air bag while being easy to assemble for reduction of assembly costs. The bias flap advantageously does not interfere with the normal folding operation of the air bag or require any extra fasteners in the air bag module. The assembly of the bias flap to the air bag module does not require any secondary operations such as bending or crimping and does not add any extra parts to the air bag module other than the bias flap itself. Also advantageously, the bias flap is designed to easily hook onto an existing air bag retainer secured to the previously folded air bag without the use of fasteners. This permits the bias flap to be assembled to the air bag retainer after the air bag is folded and allows the bias flap to be mounted to the remainder of the air bag module simultaneously as a subassembly with the air bag retainer and air bag. In addition, no fasteners extend through the bias flap to connect to the bias flap to the air bag retainer or the module so that there is no need to align small fastening holes in a flexible bias flap with a multiplicity of other fastening holes in the module.

These advantages are accomplished in the present invention by providing an air bag module having an air bag and a bias flap for guiding deployment of the air bag. The bias flap includes a flat flap member folded to a U-shape to provide opposing side walls interconnected by an end wall. The bias flap also includes a flat brace member including opposing side portions interconnected by at least one tether extending between the side portions. The side portions of the brace member are bent upwardly and joined to respective side walls of the flap member. In addition, the air bag is located between the side walls of the bias flap, the tether is positioned beneath the air bag, and the side walls are partially folded atop the air bag.

In accordance with a further aspect of this invention, the air bag module includes an air bag retainer secured to the air bag. The air bag retainer includes a plurality of outwardly projecting tabs extending out through the air bag. Also, the side walls of the flap member and the side portions of the brace member each include a plurality of matably aligned slits extending therethrough. The slits are hooked over the tabs of the air bag retainer to connect the bias flap to the air bag retainer. Preferably, the slits are spaced such that the tethers are pulled taut beneath the air bag when the bias flap is assembled to the air bag retainer.

In accordance with another aspect of this invention, the air bag module includes an air bag and an inflator for generating gas to inflate the air bag. An air bag retainer is secured to the air bag. A bias flap is formed separate from the air bag and guides deployment of the air bag. The bias flap includes opposing side walls and at least one tether extending therebetween and connecting the side walls. The air bag and air bag retainer are located between the side walls of the bias flap and the tether extends beneath the air bag and air bag retainer to securely anchor the bias flap to the air bag during air bag deployment.

BRIEF DESCRIPTION OF THE DRAWINGS

An embodiment of the present invention is described, by way of example only, with reference to the accompanying drawings in which:

FIG. 2 is a perspective view of the air bag module in the assembled condition;

FIG. 3 is an enlargement of the encircled portion as indicated at 3 in FIG. 2;

FIG. 4 is a sectional view taken along line 4—4 of FIG. 2; and

DESCRIPTION OF THE PREFERRED EMBODIMENT

Figure 1:
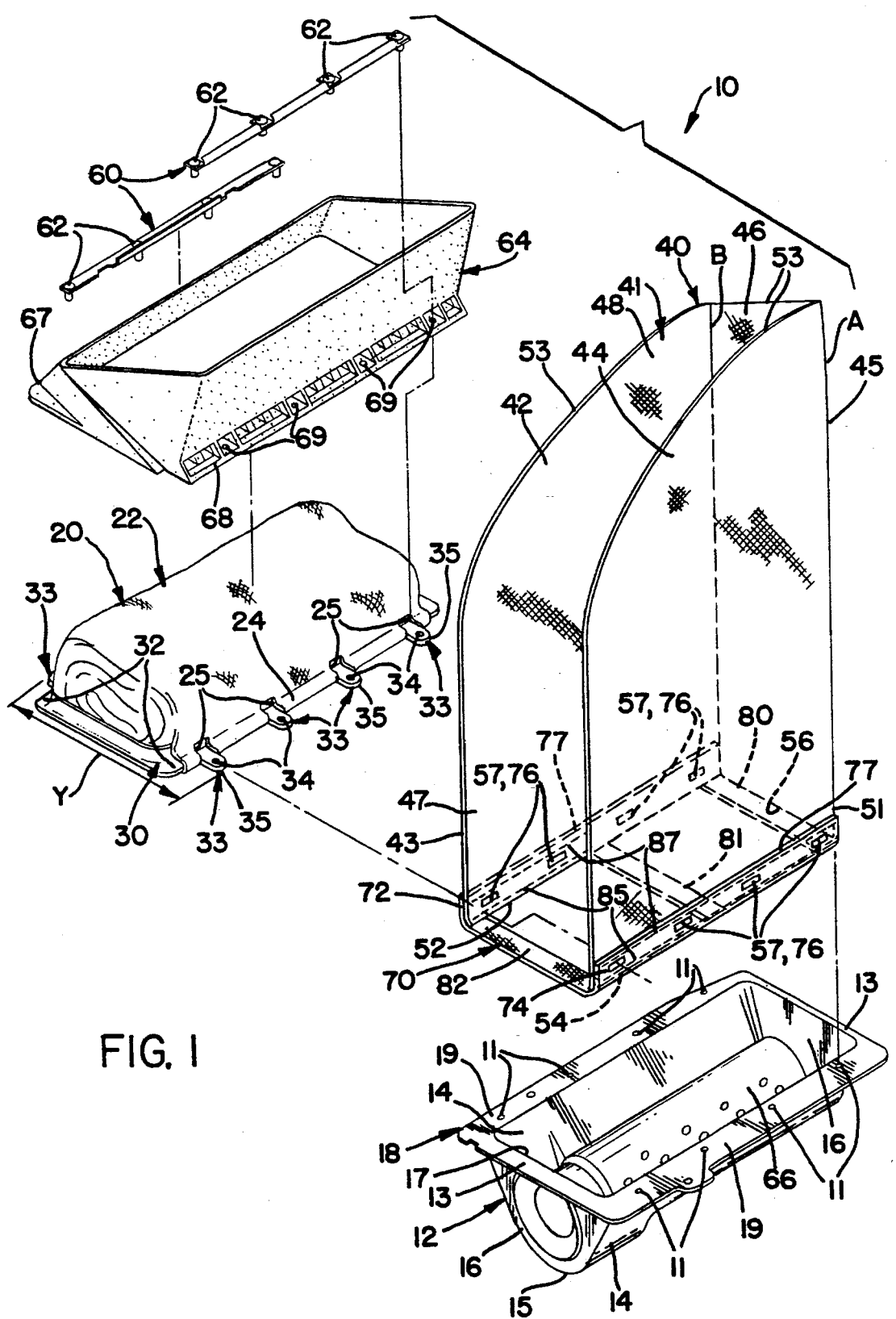
FIG. 1 is an exploded perspective view of the air bag module.

A vehicle includes an air bag module 10 mounted beneath an instrument panel structure (not shown) in a vehicle. As best shown in FIG. 1, the air bag module 10 includes a bias flap assembly 40, a cushion assembly 20 including an air bag 22 and an air bag retainer 30, a pair of fastener clips 60 having fasteners 62, a sheet metal canister 12, an air bag cover 64, and an inflator 66 mounted in the canister 12.

As best shown in FIG. 1, the sheet metal canister 12 includes longitudinally spaced apart opposing forward and rearward canister side walls 14 joined by a U-shaped canister bottom wall 15. The canister side walls 14 are connected by laterally spaced apart opposing canister end walls 16. The canister side walls 14 and canister end walls 16 cooperatively form a canister opening 17. The canister opening 17 is bordered by a generally flat, outwardly extending canister flange 18 having forward and rearward side flanges 19 and end flanges 13. The side flanges 19 each include a plurality of spaced apart canister apertures 11 therein for receiving the fasteners 62 of the fastener clips 60 therethrough, as described further hereinafter.

As best shown in FIG. 1, a generally cylindrical inflator 66 is located within the canister 12 and has opposing ends supported by the canister end walls 16. The inflator 66 may be of any conventional construction for generating gas to inflate the air bag 22 upon sensing predetermined vehicle conditions.

The cushion assembly 20 includes the inflatable air bag 22 and the air bag retainer 30. The air bag retainer 30 is secured to a mouth portion 23 of the air bag 22 through which inflator gas is received during air bag inflation. The air bag retainer 30 is preferably formed of a sturdy material, such as metal, and includes forward and rearward retainer side members 32 each having a plurality of integrally formed, laterally spaced apart, outwardly projecting locating tabs 33 thereon. The tabs 33 each have a retainer aperture 34 therethrough. The locating tabs 33 are preferably flat and straight and are adapted for abutting upper surfaces of the side flanges 19 of the canister. The retainer apertures 34 of the tabs 33 are aligned with the canister apertures 11 to receive respective fasteners 62 of the fastener clips 60 therethrough when the cushion assembly 20 is mounted on the canister 12.

Referring to FIGS. 1 and 2, the air bag 22 is formed of a suitable fabric material and is normally stored beneath the instrument panel in a folded condition atop the inflator 66. The mouth portion 23 of the air bag 22 includes a hem portion 24 in which the air bag retainer 30 is captured. The hem portion 24 of the air bag 22 includes a plurality of spaced apart air bag holes 25 through which respective tabs 33 of the air bag retainer 30 project out through and beyond the air bag 22, as shown in FIG. 4. Upon generation of gas by the inflator 66, the air bag 22 deploys upwardly out through an instrument panel opening (not shown) normally closed by a hinged cover door (not shown).

As shown in FIGS. 1 and 2, the air bag module 10 may also include an air bag cover 64 mounted atop the air bag retainer 30 to assist in maintaining the air bag 22 in its folded condition prior to deployment. The forward edge 67 and rearward edge 68 of the cover 64 each include a plurality of cover apertures 69 laterally spaced apart for alignment with the retainer apertures 34 and the canister apertures 11 for receiving respective fasteners 62 of the fastener clips 60 therethrough during module 10 assembly.

The bias flap assembly 40 is provided to control the direction of air bag inflation and is shown in FIG. 1 in a fully extended condition which occurs during air bag deployment. The bias flap 40 is formed completely independent and separate from the air bag 22. More particularly, the bias flap 40 preferably includes an upper flap member 41 and a lower brace member 70, best shown in FIGS. 1 and 5. The upper flap member 41 is preferably made of a flat sheet of uncoated fabric or other flexible, foldable material as shown in the unassembled condition in FIG. 5. The flat upper flap member 41 is bent to form a U-shaped chute as shown in FIG. 1 oriented to have an inboard side 43 closest to the center of the vehicle and a laterally opposite outboard side 45. The flap member 41 includes a forward flap side wall 42 and a rearward flap side wall 44 connected by a flap end wall 46 connecting the outboard edges of the forward flap side wall 42 and the rearward flap side wall 44. As shown in FIG. 1, the flap member 41 has an open inboard end 47 opposite the end wall 46 as defined by the space between the forward flap side wall 42 and the rearward flap side wall 44. The flap member 41 is normally stored in the air bag module 10 in a folded condition located mainly atop the folded air bag 22. Upon air bag inflation, the flap member 41 forms a U-shaped passageway 48 through which the air bag 22 deploys. The flap member 41 further includes forward, rearward and end lowermost side edges 52, 54, 56 of the flap side walls and end wall 42, 44, 46, respectively, for attachment to the brace member 70 to form the bias flap 40, as will be described further hereinafter. The forward and rearward lowermost side edges 52, 54 each include a plurality of flap member slits 57 spaced for receiving the locating tabs 33 of the air bag retainer 30 therethrough during assembly of the module 10, as described further hereinafter.

Figure 5:
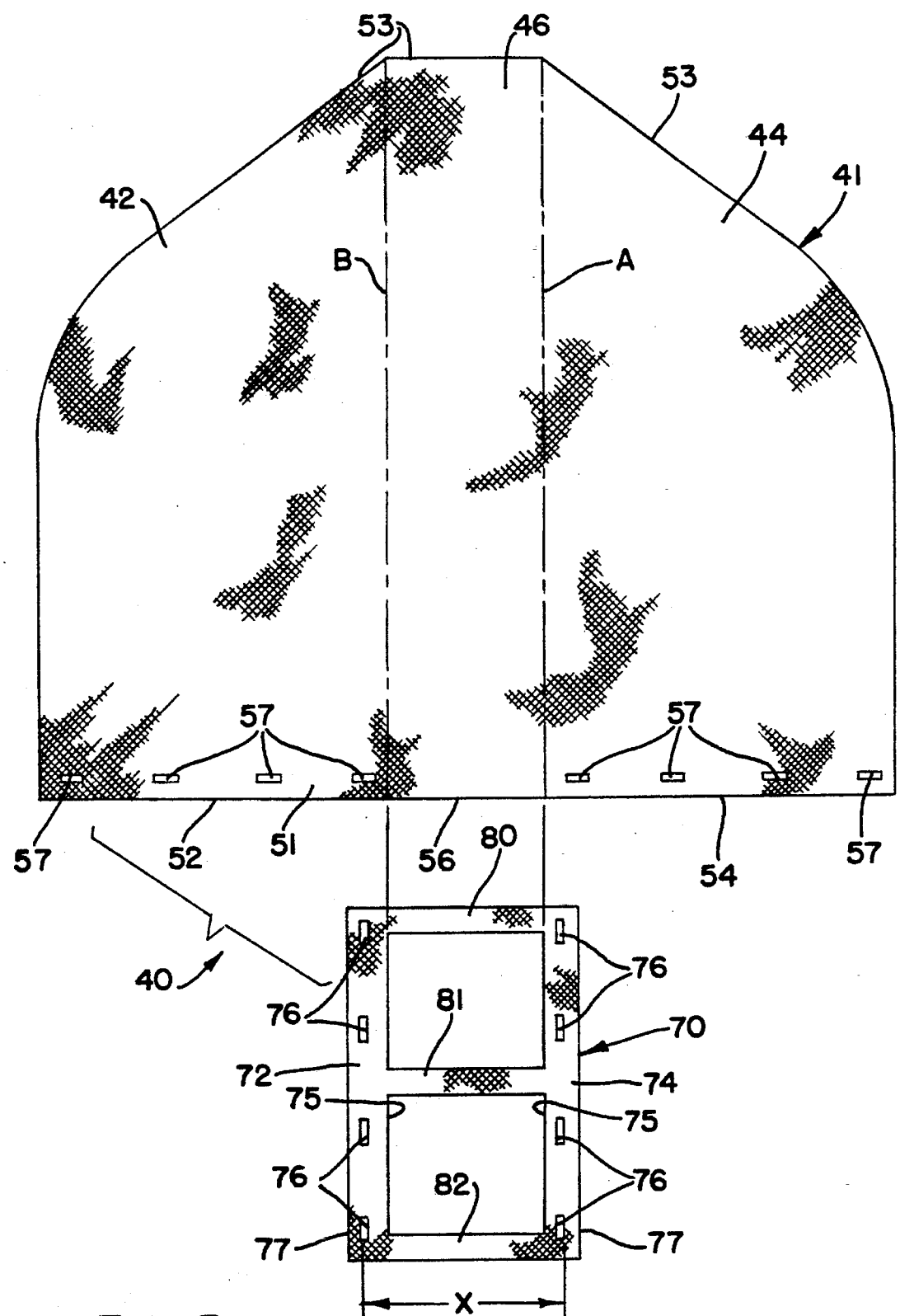
FIG. 5 is a plan view of a bias flap in the unassembled condition showing a flap member and a brace member.

Referring to FIGS. 1 and 5, the lower reinforcing brace member 70 of the bias flap 40 is preferably formed from a flat sheet of fabric or other flexible, foldable material, such as a neoprene coated nylon, which also has some resilient properties. The brace member 70 includes a laterally elongated forward side brace portion 72 for attachment to the forward flap side wall 42 and a spaced apart opposing laterally elongated rearward side brace portion 74 for attachment to the rearward flap side wall 44. Each of the side brace portions 72, 74 of the brace member 70 include a plurality of brace member slits 76 spaced for alignment with the flap member slits 57 when assembled thereto. The brace member 70 further includes integrally formed, longitudinally extending first, second and third tether straps 80, 81, 82 which are laterally spaced apart. The tether straps 80, 81, 82 extend between and interconnect the forward and rearward side brace portions 72, 74 of the brace member 70. Preferably the first, second and third tether straps 80, 81, 82 interconnect the outboard end, inboard end and middle, respectively, of the forward and rearward side brace portions 72, 74.

Referring to FIGS. 1 and 5, the bias flap 40 is assembled by suitably attaching the side brace portions 72, 74 of the brace member 70 to the flap side walls 42, 44 of the flap member 41. More particularly, the upper flap member 41 is bent along lines A and B to a U-shape such that the forward and rearward lowermost side edges 52, 54 of the forward and rearward flap side walls 42, 44 are aligned with inner edges 75 of the forward and rearward side brace portions 72, 74 of the brace member 70. The forward and rearward side brace portions 72, 74 of the brace member 70 are folded upwardly such that the brace member slits 76 are aligned with the flap member slits 57 and such that forward and rearward outer edges 77 of the brace member 70 are located above respective flap member slits 57. As best shown in FIG. 1, a laterally extending lower seam 85 is sewn along the lateral length of the brace member 70 beneath the aligned brace member slits 76 and flap member slits 57 and a laterally extending upper seam 87 is sewn along the lateral length of the brace member 70 above the aligned brace member slits 76 and flap member slits 57. The upper and lower seams 85, 87 securely join the brace member 70 to the flap member 41 to form the bias flap 40. As shown in FIGS. 1 and 5, it is preferred that the longitudinal width X defined between both the brace member slits 76 and the assembled flap member slits 57 be slightly less than a longitudinal width Y defined between outermost ends 35 of the tabs 33 on the retainer side members 32 of the air bag retainer 30. This longitudinal spacing of the slits 57, 76 enables a lower portion 51 of the bias flap 40 including the brace member 70 and the lowermost side edges 52, 54, 56 of the flap member 41 to be stretch fit over the locating tabs 33 of the air bag retainer 30 to securely connect the bias flap 40 to the cushion assembly 20 without the use of fasteners, as described further hereinafter.

The air bag module 10 further includes forward and rearward fastener clips 60 each being a laterally elongate strip holding spaced apart fasteners 62, such as rivets therein. The fasteners 62 are aligned for insertion through the respective matably aligned cover apertures 69, retainer apertures 34 and canister apertures 11 when the air bag module 10 is assembled.

The air bag module 10 is assembled as follows. The cushion assembly 20 is provided with the air bag retainer 30 secured within the hem portion 24 of the air bag 22. The air bag 22 is then folded into the compact shape shown in FIG. 1 such that the folded air bag 22 is mainly located atop the air bag retainer 30. The bias flap 40 is provided with the flap member 41 joined to the brace member 70 as described above. The bias flap 40 is then assembled to the cushion assembly 20 as follows. Referring to FIG. 1, the entire cushion assembly 20 is laterally inserted between the flap side walls 42, 44 of the bias flap 40 and the air bag 22 and air bag retainer 30 are both placed atop the tethers 80, 81, 82 of the brace member 70 such that the tabs 33 of the air bag retainer 30 are approximately laterally aligned with the corresponding aligned brace member slits 76 and flap member slits 57 in the bias flap 40. Since the slits 57, 76 are preferably longitudinally spaced apart slightly less than the outermost ends 35 of the tabs 33, the side brace portions 72, 74 of the brace member 70 and the attached lowermost side edges 52, 54, 56 of the flap side walls 42, 44 are stretched outwardly until the slits 57, 76 are stretch-fitted over the outermost ends 35 of the tabs 33 and pulled snugly onto the tabs 33 of the air bag retainer 30 as enabled by the tension of the tethers 80, 81, 82 as best shown in FIG. 4. Also in this assembled condition, the tether straps 80, 81, 82 of the brace member 70 extend beneath the air bag 22 and beneath the air bag retainer 30 and are preferably constantly pulled taut as enabled by their resiliency and the stretch-fitting of the slits 57, 76 over the tabs 33 such that the side brace portions 72, 74 of the brace member 70 and the attached flap side walls 42, 44 of the flap member 41 are secured to the air bag retainer 30 without the use of fasteners. The flap side walls 42, 44 and end wall 46 are then folded atop the folded air bag 22 into a compact shape such that a subassembly is formed including the air bag retainer 30, the air bag 22, and the bias flap 40. A suitable manner of folding the flap side walls 42, 44 and flap end wall 46 of the bias flap 40 is found in U.S. Pat. No. 5,348,343 issued Sep. 20, 1994 and assigned to the assignee of this invention. Advantageously, the bias flap 40 is secured to the air bag retainer 30 and folded out of the way atop the air bag 22 such that the cushion assembly 20 and bias flap 40 can be secured to the canister 12 without the presence of the bias flap 40 adding any further steps to the assembly. In addition, the subassembly having the air bag 22, air bag retainer 30, and bias flap 40 can be temporarily secured with rubber bands or a cover for storing or shipping to a vehicle assembly location.

The remainder of the air bag module 10 is easily assembled as follows. The air bag retainer 30, air bag 22, and bias flap 40 are simultaneously set atop the canister 12 such that the air bag retainer 30 abuts the upper surface of the canister flange 18 and the retainer apertures 34 on the tabs 33 are aligned with respective canister apertures 11. The Cover 64 may be placed over the cushion assembly 20 and bias flap 40 either before or after setting the cushion assembly 20 atop the canister 12 such that the cover apertures 69 are also aligned with respective retainer apertures 34 and canister apertures 11. As best shown in FIGS. 2–4, the forward and rearward edges 67, 68 of the cover 64 abut the bias flap 40 in the assembled condition to additionally assure that the bias flap 40 remains seated on the tabs 33 during air bag inflation. Finally, the fastener clips 60 are aligned such that the fasteners 62 extend through the matably aligned cover apertures 69, retainer apertures 34 and canister apertures 11 and are then mechanically affixed to the canister 12. Advantageously, the inflator 66 may be inserted endwise into the canister 12 either before or after assembly of air bag 22, air bag retainer 30, bias flap 40 and cover 64 to the canister 12.

In the assembled condition, it will be appreciated that the fasteners 62 advantageously do not extend through the bias flap 40. Instead the bias flap 40 is already assembled to the cushion assembly 20 without the use of any fasteners. Also advantageously, the bias flap 40 is trapped between the same fasteners 62 that retain the cushion assembly 20 and cover 64 to the canister 12 such that the bias flap 40 remains anchored to the air bag module 10 during air bag deployment. It will further be appreciated that the bias flap 40 is separate and independent from the air bag 22, yet is easily secured to the air bag retainer 30 without the use of fasteners and without sewing the bias flap 40 to the air bag 22.

Upon the vehicle experiencing a predetermined condition, the inflator 66 generates gas to inflate the air bag 22 and the air bag 22 is deployed out through the instrument panel opening by forcing open the hinged cover door normally closing the instrument panel opening. Accordingly, when the air bag 22 is deployed through the instrument panel opening, the bias flap 40 is pushed through the opening ahead of the air bag 22 causing the forward and rearward flap side walls 42, 44 and flap end wall 46 to be erected generally vertically as shown in FIG. 1, thereby providing a passageway 48 through which the air bag 22 deploys. During some air bag deployments, depending on the position of an occupant, topmost portions 53 of the flap side walls 42, 44 and flap end wall 46 may be held in a partially horizontal position by either the hinged cover door or by the occupant. When the topmost portions 53 are held at this horizontal position, the deploying air bag 22 is biased inboard through the open inboard end 47 of the bias flap 40 so that the air bag 22 inflates more inboard of the occupant. When the topmost portions 53 are moved to the fully erect position shown in FIG. 1, the air bag 22 deploys in the conventional manner through the passageway 48 formed by the bias flap 40.

It will be appreciated that the extent and duration of the biasing effect may be varied by controlling the relative size and shape of the flap side walls 42, 44 and flap end wall 46 of the bias flap 40. It will further be appreciated that during air bag deployment, the bias flap 40 is advantageously dually anchored to the air bag module 10 by hooking the slits 57, 76 over the tabs 33 of the air bag retainer 30 and also by the tether straps 80, 81, 82 which are sandwiched beneath the air bag 22 and air bag retainer 30 and above the canister 12. It will further be appreciated that the tabs 33 of the air bag retainer 30 need not be crimped over to hold the bias flap 40 during air bag deployment since the tether straps 80, 81, 82 provide an additional anchor for the bias flap 40 during air bag deployment.

It will be appreciated that the bias flap 40 advantageously does not interfere with the normal folding operation of the air bag 22. Also advantageously, the assembly of the bias flap 40 to the air bag module 10 does not require any secondary operations such as bending or crimping and does not add any extra parts to the air bag module 10 other than the bias flap 40 itself. Instead, the bias flap 40 is designed to easily hook onto an existing air bag retainer 30 having outwardly projecting tabs 33 without the use of fasteners. This permits the bias flap 40 to be assembled to the air bag retainer 30 after the air bag 22 is folded and allows the bias flap 40 to be mounted to the remainder of the air bag module 10 simultaneously as a subassembly with the air bag retainer 30 and air bag 22. In addition, no fasteners extend through the bias flap 40 to connect the bias flap 40 to the air bag retainer 30 so that there is no need to align small fastening holes in a flexible bias flap 40 with the canister apertures 11, cover apertures 69, and retainer apertures 34.

It will be understood that a person skilled in the art may make modifications to the preferred embodiment shown herein within the scope and intent of the claims. For example, although the preferred embodiment shows the flap member 41 and the brace member 70 being constructed of two separate flat pieces of material joined by sewing for easy assembly, it is contemplated that the flap member 41 and the brace member 70 may be joined by methods other than sewing or that the flap member 41 and brace member 70 may be formed of a single integral piece of material having suitable properties or having a reinforced partial double layer for the brace member 70. It will further be appreciated that the number of tether straps 80, 81, 82 of the brace member may be varied and that the tether straps 80, 81, 82 need not be normal to the side brace portions 72, 74 but could be angled or of any other configuration that connects the side portions 72, 74 of the brace member 70 to each other and that extends beneath the air bag retainer 30 to anchor the bias flap 40 to the module 10 during air bag deployment. As another example, many other variations of the forward and rearward flap side walls 42,44 and the flap end wall 46 are possible and several are described in U.S. Pat. No. 5,348,343, previously mentioned. It will further be appreciated that the fastener clips 60 may be eliminated and that individual fasteners 62 may be used to connect the cover 64, air bag retainer 30 and canister 12. The preferred embodiment shows the bias flap 40 oriented to bias the air bag deployment laterally inboard. However, the bias flap 40 could be reoriented to bias the air bag 22 in the laterally outboard direction. It will further be appreciated that the cover 64 may be eliminated or that many other suitable cover designs may be utilized with this invention.

While the present invention has been described as carried out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag module comprising:

an air bag;

a bias flap for guiding deployment of the air bag including a generally U-shaped flap member including opposing side walls interconnected by an end wall, and a brace member including opposing side portions interconnected by at least one tether extending therebetween, the side portions of the brace member being upwardly extending and connected to the respective side walls of the flap member; and the air bag being located between the side walls of the bias flap and the side walls being partially folded atop the air bag.

2. The air bag module of claim 1 wherein the at least one tether is positioned beneath the air bag.

3. The air bag module of claim 1 wherein the at least one tether extends normal to the side portions of the brace member.

4. The air bag module of claim 1 wherein the air bag module includes an air bag retainer secured to the air bag, the air bag retainer including a plurality of outwardly projecting tabs extending out through the air bag and wherein the side walls of the flap member and the side portions of the brace member each include a plurality of slits extending therethrough and wherein the slits of the brace member are matably aligned with the slits of the flap member and the matably aligned slits are hooked over the tabs of the air bag retainer to connect the bias flap to the air bag retainer.

5. The air bag module of claim 1 wherein the air bag module further includes an air bag retainer attached to the air bag and wherein the air bag and air bag retainer are located between the side walls of the bias flap and wherein the at least one tether extends beneath the air bag retainer whereby the at least one tether securely anchors the bias flap to the air bag module during air bag deployment.

6. An air bag module comprising:

an air bag;

an air bar retainer secured to the air bag, the air bag retainer including a plurality of outwardly projecting tabs extending out through the air bag; and a bias flap for guiding deployment of the air bag, the bias flap including a plurality of slits therein, the slits of the bias flap being hooked over respective tabs of the air bag retainer such that the tabs extend out beyond the bias flap whereby the bias flap is attached to the air bag retainer, the bias flap including opposing side walls interconnected by at least one tether extending therebetween, the at least one tether being located beneath the air bag and air bag retainer when the bias flap is connected to the air bag retainer and the slits being located on the side walls of the bias flap.

7. The air bag module of claim 6 wherein the slits on the opposing side walls are spaced apart such that the at least one tether is pulled taut between the side walls when the slits of the side walls are hooked over the respective tabs of the air bag retainer such that the bias flap is securely attached to the air bag retainer.

8. The air bag module of claim 6 wherein the tabs include outermost ends projecting away from the opposing side walls when the bias flap is secured to the air bag retainer and wherein a first distance defined between the outermost ends of the tabs is greater than a second distance defined between the slits in the opposing side walls of the bias flap such that the slits of the bias flap are stretch-fitted over the tabs of the air bag retainer for attachment thereto and the at least one tether is pulled taut between the slits.

9. An air bag module comprising:

an air bag;

an air bag retainer secured to the air bag, the air bag retainer including a plurality of outwardly projecting tabs extending out through the air bag; and a bias flap for guiding deployment of the air bag, the bias flap including a plurality of slits therein, the slits of the bias flap being hooked over respective tabs of the air bag retainer such that the tabs extend out beyond the bias flap whereby the bias flap is attached to the air bag retainer, the bias flap including a flap member having opposing side walls and the bias flap including a brace member having opposing side portions interconnected by at least one tether extending therebetween, and the side portions of the brace member being joined to the side walls of the flap member and the slits of the bias flap extending through both the side portions of the brace member and the side walls of the flap member.

10. The air bag module of claim 9 wherein the at least one tether extend normal to the side portions of the brace member.

11. An air bag module comprising:

an air bag;

an air bag retainer secured to the air bag, the air bag retainer including a plurality of outwardly projecting tabs extending out through the air bag; and a bias flap for guiding deployment of the air bag, the bias flap including a plurality of slits therein, the slits of the bias flap being hooked over respective tabs of the air bag retainer such that the tabs extend out beyond the bias flap whereby the bias flap is attached to the air bag retainer, the bias flap including an upper flap member folded atop the air bag and forming a chute through which the air bag deploys, the bias flap including a lower brace member connected to the flap member, the brace member including at least one tether extending beneath the air bag and air bag retainer, and the slits extending through the brace member and the flap member, and the bias flap being attached to the air bag retainer by stretch-fitted insertion of the tabs of the air bag retainer through corresponding slits in the bias flap whereby the bias flap is secured around the air bag retainer and the at least one tether is pulled taut beneath the air bag.

12. A method of assembling an air bag module including an air bag comprising the steps of:

a) providing an air bag retainer having a plurality of outwardly projecting tabs thereon;

b) attaching the air bag retainer to the air bag with the tabs extending out through the air bag;

c) folding the air bag;

d) providing a bias deployment flap having opposing side walls interconnected by at least one tether;

e) providing slits in the side walls of the bias flap;

f) inserting the air bag retainer and air bag between the side walls of the bias deployment flap and atop the at least one tether; and g) hooking the slits of the bias flap onto respective tabs of the air bag retainer and folding the side walls of the bias flap atop the air bag.

* * * * *